UNITED STATES PATENT OFFICE.

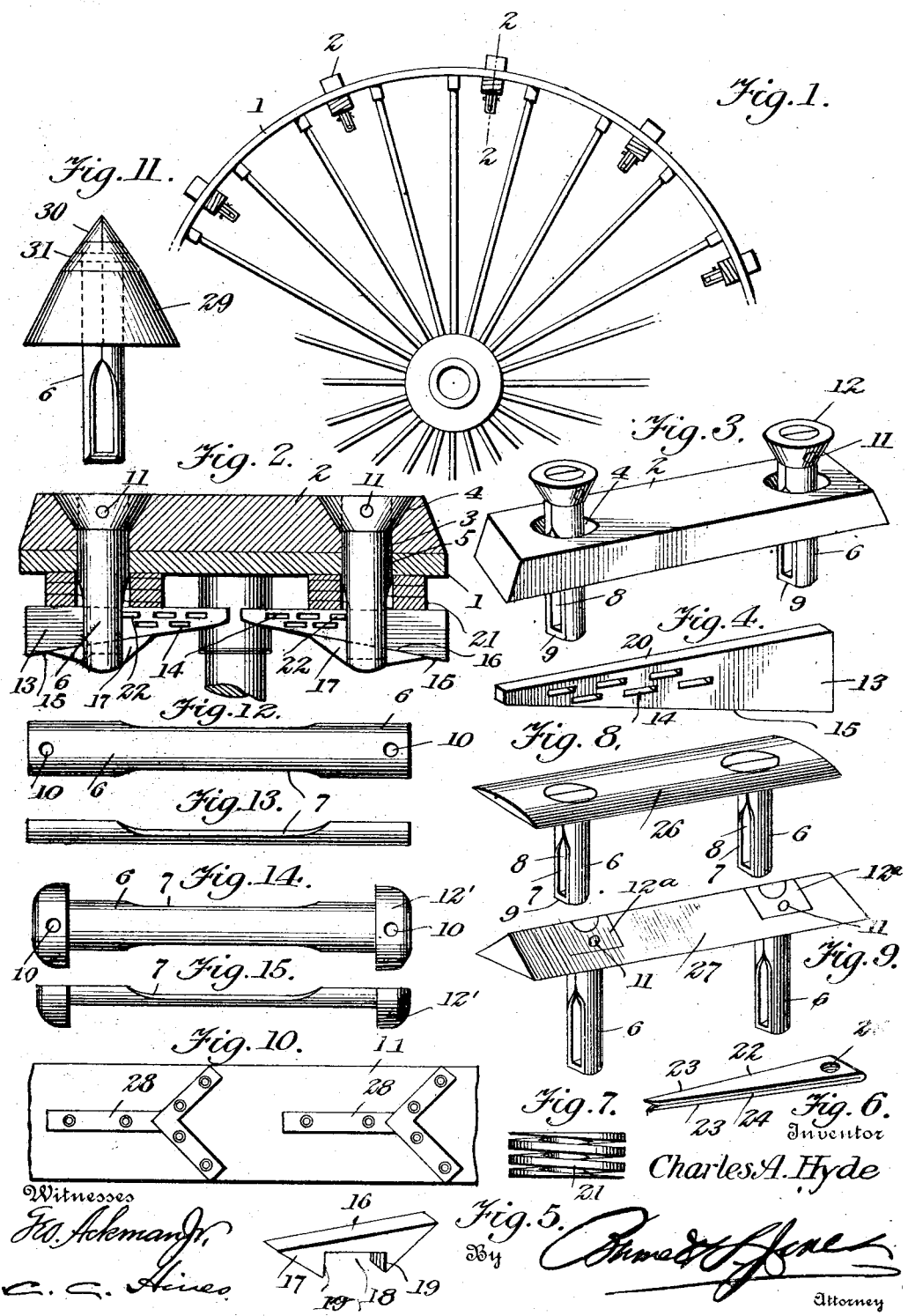

CHARLES A. HYDE, OF CLEAR SPRING, MARYLAND.

DETACHABLE TREAD-CLEAT FOR TRACTORS.

1,114,768.  Specification of Letters Patent.  Patented Oct. 27, 1914.

Application filed January 24, 1914. Serial No. 814,103.

*To all whom it may concern:*

Be it known that I, CHARLES A. HYDE, a citizen of the United States, residing at Clear Spring, in the county of Washington and State of Maryland, have invented certain new and useful Improvements in Detachable Tread-Cleats for Tractors, of which the following is a specification.

This invention relates to a detachable tread cleat for tractors, the object of the invention being to provide a tread cleat which may be substituted for the usual spurs, and which, when in use, will give the wheel a firm gripping engagement with the ground without cutting into or injuring the road to any appreciable extent.

A further object of the invention is to provide simple, reliable and efficient means whereby the cleats may be easily and quickly applied to the tractor wheel and as readily and conveniently removed therefrom when desired and which, when applied, will be permanently held in position.

A still further object of the invention is to provide interchangeable traction cleats of different forms which may be employed at different times to suit the condition of the road, and whereby slippage of the wheels may be prevented over rough roads by the use of one type of cleat, and allowing a different form of cleat to be used in traveling over macadamized and other finely finished roads in order to prevent damage thereto.

A still further object of the invention is to provide fastening means for detachably securing the interchangeable cleats in position in such manner as to positively prevent the same from becoming loose or accidentally detached, as well as to take up all wear and prevent the parts from rattling; and, further, to provide a form of cleat which may be used as a blank cleat, when the gripping cleats are not being employed, but which will also give sufficient traction purchase and will serve as a means for retaining the fastening devices upon the wheel against possible loss or displacement.

The invention consists in the features of construction, combination and arrangement of parts, reference being had to the accompanying drawings, in which—

Figure 1 is a side elevation of a tractor wheel, showing the application of my improved cleats thereto; Fig. 2 is a transverse section through the wheel rim, showing one of the cleats applied, the plane of section being such as is indicated by the line 2—2 of Fig. 1; Fig. 3 is a perspective view of the cleat shown in Fig. 2, with the fastening bolts partially withdrawn; Fig. 4 is a perspective view of the draw wedge; Fig. 5 is a perspective view of the wedge seat piece; Fig. 6 is a perspective view of the cotter pin for adjustably fastening the wedge in position; Fig. 7 is a side view of the anti-rattling and wear take-up spring; Fig. 8 is a perspective view of the blank cleat; Fig. 9 is a similar view of a modified form of cleat; Fig. 10 is a plan view of a portion of the wheel rim showing still another form of cleat; Fig. 11 is a view of still another form of cleat; Figs. 12, 13, 14 and 15 are views showing the bolt blanks as they appear before being bent to form the completed bolts.

Referring particularly to Figs. 1 to 7, inclusive, of the drawings, 1 designates the rim of a traction wheel of a traction engine or other tractor, which is provided at intervals around its periphery with traction cleats 2, constituting one of a series of interchangeable cleats which may be employed, which cleats 2 are adapted for use in obtaining a firm purchase or gripping engagement between the wheel and the ground, to prevent the wheel from slipping. Each of the said cleats 2 comprises a bar, which is substantially coextensive in length with the width of the rim 1, and, as shown in Figs. 1, 2 and 3, is of rectangular form in cross section. The inner face of this bar is adapted to fit against the outer surface of the rim 1, while the outer face thereof is flat or slightly rounded and forms a gripping surface which will frictionally engage the ground, as will be readily understood.

As shown, the cleat 2 is provided on opposite sides of its transverse center with openings 3 having tapered outer portions or countersinks 4 and which register with openings 5 formed in the rim 1. These openings are adapted for the passage of bolts 6, which may be formed from blanks of the construction shown in Figs. 12 and 13, or Figs. 14 and 15. The bolts shown particularly in Figs. 1, 2 and 3 are made from the form of blank illustrated in Figs. 12 and 13, which blank consists of a half round strip of metal, doubled or folded upon itself on a transverse medial line, the sides and intermediate portion of the blank being reduced or cut away, as shown at 7, so as to produce in the formed bolt a longitudinal transverse slot 8. The arms or folds of the bolt so formed are united at one end by an integral end portion 9, formed by the central part of the blank, while the flattened faces of the free ends of the folds or arms of the bolt blank contact with each other and are provided with registering openings 10 for the passage of rivets or other suitable fastenings 11. These rivets also serve to confine upon such portion of the bolt a conical collar or head 12, which is adapted to lie within the countersink 4, flush with the outer surface of the cleat 2, while the slotted shank or end of the bolt projects inwardly from the inner face of the rim 1. A bolt of this form is of maximum strength and durability, may be economically manufactured and is adapted especially for use in conjunction with my improved fastening elements to obviate the well known objections to threaded bolts and the use of nuts in connection therewith.

The fastening device employed for use in conjunction with each slotted bolt for detachably securing the cleat in position comprises a triangular wedge 13, which passes through the slot 8 in the bolt and is provided with a plurality of longitudinal series of elongated slots 14, the slots of each series being arranged on lines between or in staggered relation to the slots of the other series. The inclined edge 15 of this bolt engages the inclined face 16 of a wedge seat piece 17, also substantially of triangular form, and which is provided at the angle of intersection of its other faces or sides with a notch or recess 18 to receive and engage the end portion 9 of the slotted bolt, said notch or recess providing stop shoulders 19. The wedge seat piece is extended through the slot 8 between the inclined face of the wedge and the end portion 9 of the bolt and forms an abutment surface for such inclined face of the wedge, the shoulders 19 serving to lock the said seat piece in position without the use of auxiliary fastenings.

The straight longitudinal edge 20 of the wedge 13 is arranged to bear against a coiled helical or spiral spring 21, which is disposed between said wedge and the inner face of the rim 1 and surrounds the adjacent portion of the bolt. When the wedge is inserted in position, it is obvious that it draws the bolt inward to clamp the cleat 2 tightly against the face of the rim, and when the bolt is fully drawn into clamping position the relationship of the coils of the spring may be such that they will stand slightly apart, by which the spring will hold the elements of the fastening tightly assembled and take up the wear and prevent rattling under all conditions of surface. As wear occurs it will of course be understood that the wedge 13 may be forced inward to an additional degree, its series of slots 14 permitting of such action and the use of a locking key in an adjustable manner to lock the wedge in place in any of its positions of adjustment. The locking key 22 preferably employed consists of a cotter-pin folded from a strip of bendable metal to provide the prongs or limbs 23, which are adapted to be bent in opposite directions for the passage of the key or cotter-pin through a designated slot 14, to lock the cotter-pin or key against displacement. The cotter-pin or key is of triangular form and has an inclined surface 24, and thus is adapted to act as a wedge to additionally draw upon the wedge fastener 13, to securely hold the latter in position. It will be evident that the slots 14 permit of the adjustment of the wedge 13 to any desired degree, and in practice these slots are preferably made of such length as to permit the draw key 22 to be taken up or inserted farther from time to time for a wedging action in the event of loosening of the wedge fastener 13 from wear or other causes. At or near its bight or fold the key is provided with an opening 25 for the application of a chain or like connection whereby it may be coupled to the wall against any possibility of loss or displacement.

An arrangement, as above described, embodies great strength and rigidity and insures the heads of the bolts being securely seated upon the cleat and obviates the liability of the turning of the bolt. The corners of the slots of the bolts are prevented from biting against the sides of the wedge or wedge seat. The narrow surface of the bolt cannot wear or press upon the wedge to cause a depression therein and permit of the loosening of the wedge, and the particular and peculiar construction of the cotter pin not only serves as a means for sustaining the wedge but also for drawing the same in one direction to properly position the bolt and retain the same in such position.

In Figs. 14 and 15 of the drawings, I have shown a modified form of bolt blank which may be used when the collar or head 12 is not employed. This blank is similar in construction to the blank shown in Figs. 12 and 13, except that it is provided at its end portions with semi-circular enlargements 12' adapted when the blank is folded to complete the form of the bolt to coöperatively form a head for the bolt.

In Fig. 8 I have shown the use, in conjunction with a bolt formed from the blank shown in Figs. 14 and 15, of a modified form of cleat 26. The cleat consists of a bar or plate having a flattened side to bear against the wheel rim and a curved outer face to bear upon the ground, said cleat being comparatively thin so as to lie close to the rim of the wheel. This form of cleat, which may be termed a blank cleat, is designed to be used when spurs or gripping cleats are not employed and to serve as a fixture by which the fastening devices, which are employed to secure the same in position, will be retained upon the wheel against any possibility of loss or displacement, so that they will always be at hand whenever it is desired to employ any of the other and interchangeable cleats. The rounded surface of the cleat 26 allows the wheel to travel over macadamized and other fine roads without injury, while giving sufficient purchase to prevent the wheel from slipping.

In Fig. 9 I have shown another modified form of cleat 27, used in conjunction with bolts formed from the type of blank illustrated in Figs. 12 and 13, with a modified form of auxiliary head. As shown, this cleat 27 consists of a bar of triangular form having its flat surface disposed for use as an abutment surface to rest against the wheel rim 1, and having its apex or edge portion arranged to provide a gripping surface, which is adapted to bite or sink into the ground. A series of these cleats may be used whenever desired in traveling over rough and sandy roads, as well as muddy roads, to insure a firm engagement between the wheel and the ground and to prevent the wheel from slipping. The head 12$^a$ used upon the bolt in this modified form of the invention is triangular shaped and has its outer surface or sides arranged to lie flush with the inclined surfaces of the acting face of the cleat 27.

In Fig. 10 I have shown still another modified form of cleat, two of which are shown arranged at proper intervals upon the wheel rim 1, the cleat 28 illustrated in this instance being approximately of Y-form, the arms of the cleat being secured to the wheel rim by the type of bolt and head illustrated in Figs. 2 and 3, and the said arms of the cleats being so arranged that they will afford adequate purchase and at the same time prevent the wheel from slipping circumferentially or laterally.

In Fig. 11 I have shown still another modified form of traction gripper, which is designed for use in place of the spurs commonly employed and to provide a pointed or conical gripping cleat for engagement with hard or icy surfaces to obtain a firm grip and prevent the wheel from slipping. As shown, this gripping element or cleat comprises a frusto-conical body 29, the apex or crown portion of which is completed by a conical bolt head 30, secured to the outer end of the bolt by means of a pin or rivet 31 passing through the opening 10 in the bolt, as in the construction shown in Figs. 2 and 3. It is evident that when the spur portion 30 wears away, it may be removed by detaching the rivet and a new spur portion substituted in its place.

In the illustrated embodiments of the invention I have shown the use of several styles of cleats or gripping devices, but it is to be understood that others may be employed, and that a series of interchangeable cleats of various shapes and forms and constructions may be used as may be found advisable in actual service, the primary purpose of the invention being to provide a construction of fastening means whereby a series of interchangeable cleats or gripping devices may be employed to suit the conditions of service.

While cleats of the forms shown are provided, and are illustrated as exemplifying some of the ways of carrying my invention into practical effect, it is to be understood that I do not confine the invention to the particular forms of cleats herein disclosed, but reserve the right to make the cleats of any desired form and shape and within the scope of the invention defined by the appended claims.

The form of bolt herein shown is preferably made from drawn metal, and when the bolt blank is folded the arms thereof are preferably welded or otherwise firmly united. If desired, the annular heads or bands may be shrunk upon or welded to the end of the bolt. By this means a bolt is provided which is practically unbreakable, insuring an absolutely reliable connection of the cleat with the wheel rim.

Having thus described my invention, I claim:

1. A tractor wheel having a rim provided with an opening therein, a gripping member upon the rim, a slotted bolt engaging the gripping member and extending through the opening in the rim, a notched wedge seat piece engaging the inner end of the bolt and extending through the slot therein, a wedge inserted through the slot in the bolt and engaging said seat piece, and a wedge-shaped locking key for coöperation with the wedge.

2. A traction wheel having a rim provided with an opening therein, a gripping member upon the rim, a slotted bolt engaging the gripping member and extending through the opening in the rim, a notched wedge seat piece engaging the inner end of the bolt and extending through the slot therein, a wedge extending through the slot in the bolt and engaging the seat piece, a key engaging the wedge, and a coiled spring surrounding the bolt between the rim and wedge.

3. A traction wheel having an opening therein, a cleat having a slot and an opening communicating with the slot, a slotted bolt formed of a doubled strip of material passing through the openings in the cleat and rim, a removable head secured to the bolt, said head conforming to the shape of and filling the slot in the cleat, and fastening means engaging the slotted bolt to clamp the cleat in position.

In testimony whereof I affix my signature in presence of two witnesses.

CHARLES A. HYDE.

Witnesses:
D. ELMER WOLF,
PALMER TENNANT.